Dec. 19, 1933.  J. JENSEN  1,940,497
SHEAR
Filed June 29, 1931
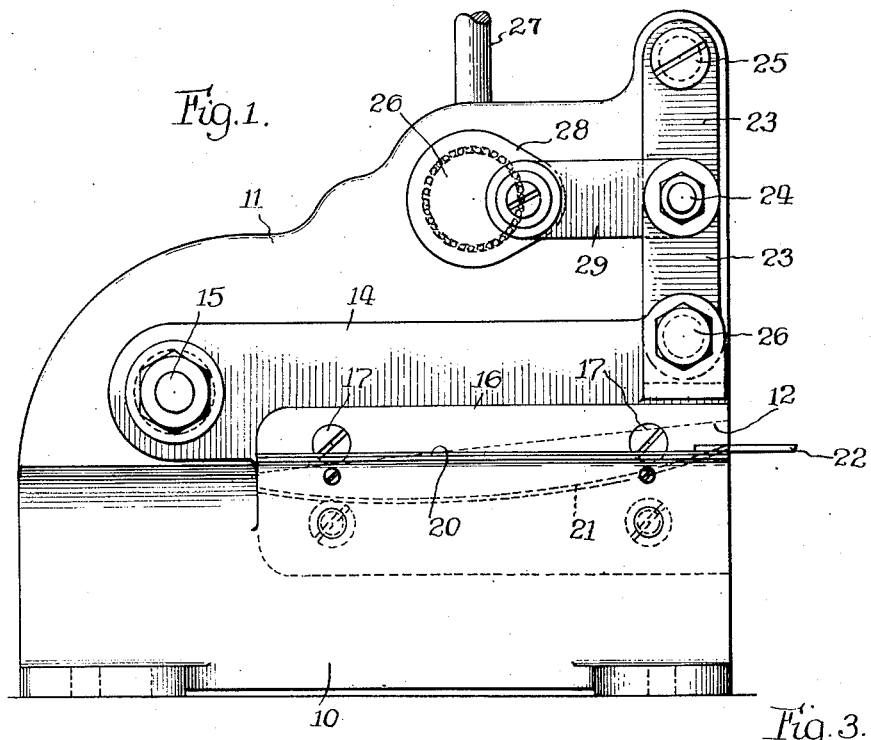
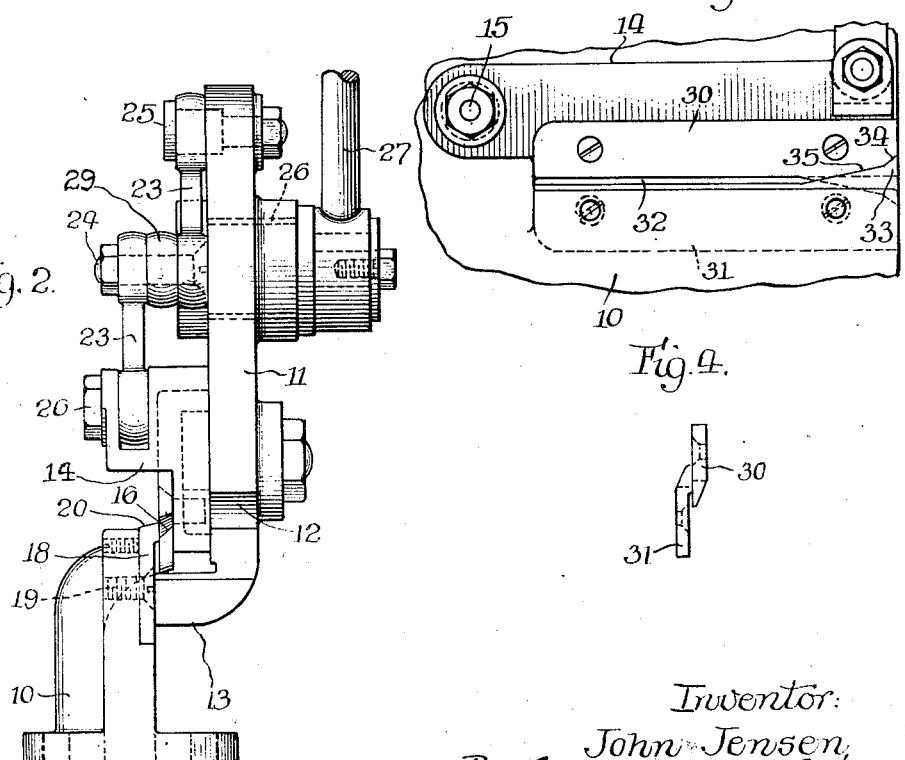
Inventor:
John Jensen Patented Dec. 19, 1933

1,940,497

UNITED STATES PATENT OFFICE 1,940,497

SHEAR

John Jensen, Rockford, Ill., assignor to Whitney Metal Tool Company, Rockford, Ill., a corporation of Illinois Application June 29, 1931. Serial No. 547,585

4 Claims. (Cl. 164—46)

The invention relates generally to shears for cutting sheets of metal or the like and more particularly it relates to shears wherein the movable blade is pivoted adjacent to the rear or inner end of the throat of the shear.

An important object of the present invention is to provide such a shear having new and improved actuating mechanism whereby the forward ends of the shear blades may be used to perform slitting, notching or similar operations upon the edge of the work with the work so positioned as to afford the operator an unobstructed view of the point of cut.

Another object is to provide a shear of this character having blades of novel form arranged to facilitate the cutting of slits or notches of accurately predetermined extent in the edge of a work piece.

Other objects and advantages will become apparent from the following description taken in connection with the accompanying drawing in which:

Figure 1 is a side elevational view of a shear embodying certain features of the invention.

Fig. 2 is a front elevational view of the shear shown in Fig. 1 as viewed from the right hand side.

Fig. 3 is a fragmental portion of Fig. 1 showing the shear equipped with another type of shear blade.

Fig. 4 is an end view of the shear blades shown in Fig. 3.

Generally considered, the invention as herein shown comprises a manually operable shear in which the movable blade is pivoted on the frame near the inner end of the throat, together with powerful toggle means for moving the swinging blade, which means acts between the frame and the free end of the swinging blade and is operated by an eccentric device mounted in the frame.

Referring more particularly to the drawing the invention is herein shown as embodied in a shear comprising an elongated base frame 10 having at its rear end (left hand end in Fig. 1) an integrally formed portion or arm 11 extending upwardly and forwardly to form a throat 12 opening forwardly of the frame 10. Adjacent to its point of junction with the base 10, the arm 11 is offset laterally as will be seen at 13 in Fig. 2 so as to permit a lever 14, pivoted at 15 adjacent the rear end of the frame, to be moved downwardly across the throat 12 and past the upper edge of the base 10 which defines the lower side of the throat 12. The lever 14 serves as a carrier for a movable shear blade 16 which is secured to the lever by screws 17, and in its downward movement the lever moves the blade 16 into operative relation to a stationary shear blade 18 secured by screws 19 to the base 10.

The stationary shear blade 18 is, in the embodiment shown in Figs. 1 and 2, formed with a straight shearing edge 20 located a slight distance above the lower edge of the throat 12, while the movable shear blade has a curved edge 21 so as to adapt the blade for starting the shearing operation at any point in its length.

It is desirable in the performance of such a notching or slitting operation to make the cut gradually and at a uniform rate so as to permit accurate determination of the length of the cut. With this in view the present shear provides for the application of the operating force at the forward end of a movable blade 16 by powerful actuating means operating at its maximum efficiency near the end of the cutting stroke. This means in the form shown comprises a toggle actuator operating directly between the arm 11 and the free end of the lever 14 and operated by means of an eccentric device mounted in the arm 11 rearwardly of the toggle actuator.

The toggle actuator preferably comprises a pair of links 23 pivoted together at 24 and pivoted at their other ends to the ends of the arm 11 and the lever 14 as indicated at 25 and 26 respectively. The eccentric device employed to operate toggle links 23 comprises a shaft 26 mounted in antifriction bearings in the arm 11, rearwardly of the toggle links, and having at one end thereof an operating handle 27 for rotating the shaft. At its other end the shaft 26 has a crank 28 upon which a link 29 has one of its ends pivoted. The other end of the link is connected to the toggles 23 through the medium of the bolt which provides the pivot 24.

The link 29 is so proportioned that the toggles 23 are in their extended positions when the crank 28 is positioned to move transversely of the path of movement of the pivot 24, so that a maximum power multiplication of both the eccentric device and the toggle means is obtained simultaneously and at the end of the working stroke of the shear. In this relation the crank 28 and the link 29 constitute in effect a second toggle. This enables the operator to perform a relatively short slitting operation adjacent the ends of the shear blades 16 and 18 where the operation of the shear is clearly visible. Furthermore, due to the great power multiplication, the cutting operation may be made to progress slowly and evenly, and, therefore, may be terminated accurately.

Such a slitting or notching operation may further be facilitated by equipping the shear with blades arranged to shear progressively from the forward end of the throat 12 toward the rear end of the throat. Thus as shown in Figs. 3 and 4 of the drawing, upper and lower shear blades 30 and 31 are provided adapted particularly for short cuts and arranged in the lowermost position of the lever 14 to be spaced apart in the inner portion of the throat 12 as indicated at 32 in Fig. 3. Adjacent their outer ends (the right hand ends in Fig. 3) the blades are formed so as to start the shearing operation and shear progressively toward the inner end of the throat. This is accomplished in the present instance by forming similar projecting portions 33 on both of the blades. These projecting portions 33 form oppositely extending points at the outer ends of the two shear blades and slope rearwardly from the points at relatively steep angles as indicated at 34. Rearwardly of the sloping edges 34 the blades are provided with gradually sloping edge portions 35 which merge with the rear edge portions of the blades. Thus when the upper blade 30 is lowered the pointed ends 33 of the blade first contact the work and in such contact may be accurately positioned. The two points 33 then pierce the work piece and the shearing operation progresses rearwardly of the shear and toward the rear edge of the work.

It will be noted that the steep angle 34 provided adjacent to the forward end of the projecting portions 33 causes the shearing operation to progress quite slowly as the work is being pierced, and thereafter the edges 35 come into play so that the shearing operation progresses more rapidly as the actuating mechanism of the shear approaches its point of maximum power multiplication. Thus the form of the shear blades 30 and 31 is coordinated with the variation in the effectiveness of the toggle actuator and performance of the slitting operation is facilitated.

I claim as my invention:

1. A shear comprising a stationary member and a movable member pivoted thereto, means for actuating said movable member and a pair of cooperating shear blades secured on said members, one of said blades having a portion adjacent to the free end of said movable member arranged in relative approaching movement of the blades to cause shearing of the work progressively from the free end of said movable member toward the pivot thereof.

2. A shear comprising a stationary frame, a lever thereon, means for moving said lever, and cooperating shear blades on said frame and lever formed with projecting portions adjacent the free end of said lever arranged in relative approaching movement of the blades to start a shearing cut adjacent the free end of the lever and cut progressively toward the pivot of the lever.

3. A shear comprising a base having a lower portion and an overhanging stationary arm extending upwardly and forwardly from the rear end of said lower portion to provide a forwardly opening substantially horizontal throat, a lever pivoted on said base adjacent to the rear end of said throat and extending forwardly along said arm, cooperating shear blades fixed on said lever and said lower portion of the base, said blades being formed at their forward ends with portions projecting toward each other whereby, in downward movement of said lever, to start a shearing cut at the forward ends of said blades and cut progressively rearwardly of the blades, and means acting between the forward ends of said arm and said lever for moving said upper shear blade.

4. A shear comprising a stationary blade, a cooperating movable blade having one end pivoted, one of said blades at the end adjacent the free end of said pivoted blade having a point adapted to start the cutting operation when the pivoted blade is moved toward the stationary blade, the shearing edge forming said point being sloped at a relatively large angle transversely of the blade on which it is formed and merging with an edge portion sloping at a less angle whereby to shear more rapidly toward the pivot after the cutting operation has been started.

JOHN JENSEN.